United States Patent [19]

Smith et al.

[11] 3,825,811
[45] July 23, 1974

[54] SYSTEM AND METHOD FOR MONITORING A PRESS LOAD

[75] Inventors: Herman W. Smith, Vancouver, Wash.; Paul H. Berka, Apollo, Pa.

[73] Assignee: Aluminum Company of America, Pittsburgh, Pa.

[22] Filed: Feb. 26, 1973

[21] Appl. No.: 335,913

[52] U.S. Cl. ................................. 318/646, 72/20
[51] Int. Cl. ........................................ G05d 15/00
[58] Field of Search ........... 72/19, 20; 318/85, 561, 318/604, 605, 646

[56] References Cited
UNITED STATES PATENTS

| | | | |
|---|---|---|---|
| 2,411,139 | 11/1946 | Roy et al. | 318/646 |
| 2,998,238 | 8/1961 | Kenline | 72/20 X |
| 3,160,089 | 12/1964 | Platou | 72/20 X |
| 3,481,171 | 12/1969 | Alexander et al. | 72/20 |
| 3,564,883 | 2/1971 | Koors et al. | 72/19 X |

Primary Examiner—Gene Z. Rubinson
Attorney, Agent, or Firm—Teare, Teare & Sammon

[57] ABSTRACT

A system and method for monitoring the load on a forming press during its work cycle including a digital encoder operably connected by a servomechanism to a timing mechanism on the press so as to provide a digital output determinative of any given position of the press ram during its work cycle. A digital-to-analog converter converts the digital signal to an analog signal indicative of the ram position. The analog signal is directed to a function generator which is preprogrammed to produce a signal representative of a predetermined tolerable stress load on the press at such position of the press ram. This representative signal is compared to the actual stress load on the press, as measured by one or more strain sensing devices associated with the press, so as to produce a warning signal and/or to stop the press ram at a selected time in the work cycle when the actual load on the press exceeds the predetermined tolerable load for the system.

11 Claims, 3 Drawing Figures

PATENTED JUL 23 1974 3,825,811

3,825,811

SYSTEM AND METHOD FOR MONITORING A PRESS LOAD

BACKGROUND OF THE INVENTION

The present invention relates to a system and method for use in controlling a forming press, and more particularly relates to a novel system and method for monitoring and controlling a forming press when subjected to excess loads during its normal cycle of operation.

In the conventional operating cycle of a forming press, a movable ram having one die member is disposed and arranged for movement toward and away from another fixed die member which mounts the workpiece to be shaped therebetween. In operation, due to the nature of the configuration of the workpiece or its possible misalignment with respect to the die members, for example, the crankshaft, connecting arm and/or gears of the press may be subjected to excessive loading which may result in fatigue and/or actual damage to the press.

In the past, various types of control systems have been employed which monitored the load on the press ram so as to automatically either produce an audible or visual signal with respect thereto, or which automatically turned the press off upon excessive loading thereof. In certain instances, such systems monitored the load by means of strain gauges disposed on the support columns of the press. In such prior systems, however, the maximum tolerable force on the press at the bottom of the ram stroke was predetermined by the press manufacturer. In such cases, a comparator was generally pre-programmed to produce a control signal when the load on the press ram exceeded such maximum tolerable load condition. Moreover, such prior systems have not been satisfactory since they were activated only when the maximum load on the press actually occurred. That is, when the press ram was at the bottom of its forming stroke. However, it has been found that there are forces exerted on the press at intermediate points during the ram stroke which impose loads on the press which are less than the load on the press when the ram is at the bottom of its forming stroke, but which loads can result in fatigue and/or damage to the press. In addition, it has been found that with previous systems that the operator could not insert a workpiece in the press dies and know whether such workpiece would provide too low a load for a given press, thereby resulting in a less efficient forming operation. Therefore, it has been found important to establish the tolerable loading which can be imposed on a press at all positions of the press ram, and to provide a system and method for determining when such press loadings are exerted for either warning the operator of the occurrence of such fatigue loading and/or to deactuate the press.

SUMMARY OF THE INVENTION

A system and method for controlling the operations of a press of the type including a ram member mounted for cyclical movement on the press frame. In the invention, a rotating member is operably connected to the ram member so that its degree of rotation is related to a given position of the ram, a rotation sensing assembly is operably connected to said rotating member for producing ram position signals in response to various ram positions, a first strain signal generating assembly is disposed for receiving said ram position signals and for producing theoretical strain signals indicative of a predetermined selective strain on the press frame at each position of the ram as indicated by said ram position signals, a second strain signal generating assembly is operably associated with the press for producing actual strain signals indicative of the actual strain on the press imparted by the ram at such various positions, and a comparative signal assembly is disposed for receiving and comparing the theoretical strain signals and the actual strain signals for producing an overload or output signal when the actual strain exceeds the predetermined theoretical strain at such positions of the ram so as to provide a warning and/or to initiate stopping of the press.

By the foregoing, the following description and accompanying drawings, it will be seen that the present invention provides a system and method for monitoring the load imparted to the crankshaft, connecting arm and gears of the press throught the entire travel of the press ram. Moreover, at any time, the desirable load for any portion of the press ram cycle is exceeded, the ram completes its given cycle, whereupon, an alarm or other signal is indicated and/or the press is stopped until causation of the excessive press load can be determined. As a result, fatigue on the crankshaft, connecting arm and gears which would otherwise remain undetected is immediately determined so as to prevent any damage thereto. Accordingly, the system and method of the present invention provides an accurate and efficient monitoring during the press cycle with a minimum modification of the press structure, and is a dependable and rugged system capable of operating during heavy duty oper ations. In addition, the workpiece may be inserted between the dies so that the amount of load upon the workpiece at each of the various positions of the ram stroke can be automatically determined throughout the press cycle. MOreover, by this arrangement, considerable flexibility is provided so as to achieve the most efficient use and selection of a particular press size for a particular size and/or shape or workpiece.

DESCRIPTION OF THE PREFERRED EMBODIMENTS

Figure 1:
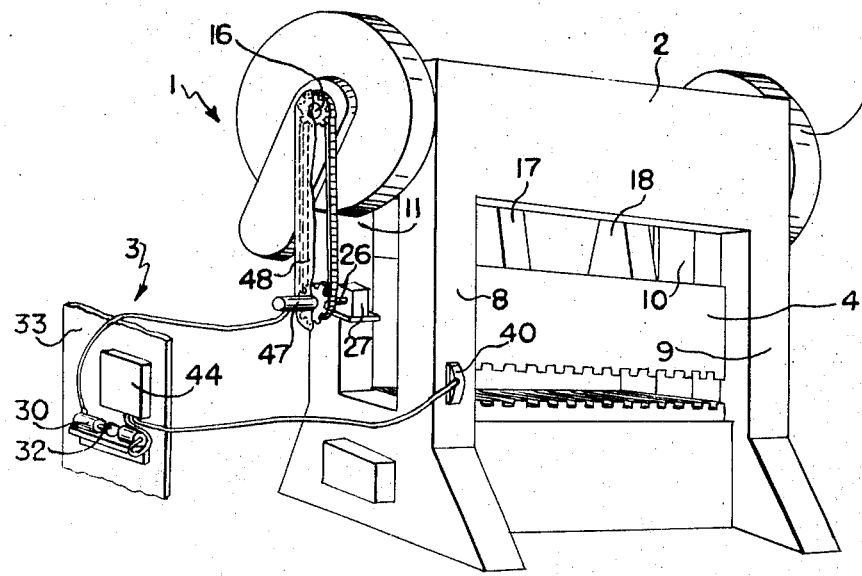
FIG. 1 is a fragmentary, generally perspective view illustrating one arrangement for mounting the various components of the system in the present invention in conjunction with one type of forging press apparatus.

In general, there is illustrated in FIG. 1 a typical "four column" forging press, designated generally at 1, with which the present invention may be employed. As shown, the press 1 may include a frame 2 which supports a press ram 4 for mounting a movable die member (not shown), and a base 6 for supporting a fixed die member (not shown), as known in the art. In the form illustrated, the frame 2 includes a plurality of spaced support columns 8, 9, 10 and 11 which carry the stress load upon actuation of the ram.

In general, the present invention includes a ram position sensing assembly 3 (FIG. 2) which senses the various positions of the ram and which is disposed so as to produce a position output signal indicative of such position. A theoretical strain signal assembly 5 is operably connected to the sensing assembly 3 for receiving the position output signal and modifying the same so as to produce a theoretical strain signal which is indicative of a predetermined selected strain. An actual strain signal assembly 7 is provided which may include one or more strain links, as at 40 of FIG. 1. Such links are mounted on the press frame for sensing the actual strain on the press during the cyclical operation of the ram 4. A comparator assembly 12 is disposed for receiving the output signals from the theoretical and the actual strain signal assemblies 5 and 7. The comparator assembly 12 acts to produce an output signal for actuating appropriate switches, as at 44 and 46 (FIG. 2), when the actual strain on one or more of the press columns deviates, in a predetermined manner, from the theoretical strain for monitoring and controlling the press operations, as will be hereinafter more fully described.

Figure 2:
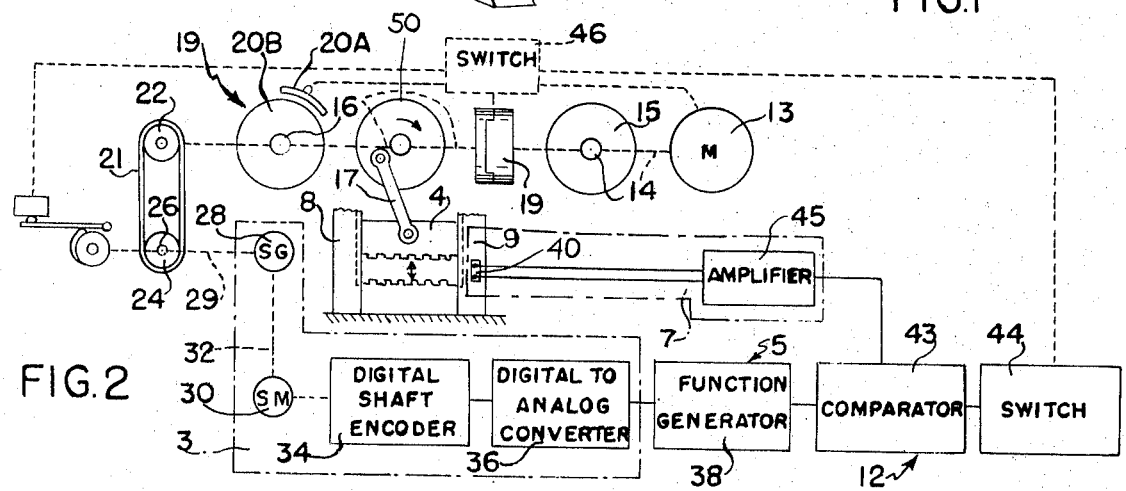
FIG. 2 is a diagrammatic illustration of the monitoring system of the present invention.

Referring now to FIG. 2, the press 1 conventionally includes a drive motor 13 which may be mounted on the frame 2 (FIG. 1) and has a drive shaft 14 which is operably connected to a flywheel 15. The drive shaft 14 (FIG. 2) may also be connected to a crankshaft 16 through suitable gearing (not shown) for actuating crankarms 17 and 18. The arms 17 and 18 are connected at one end to the ram 4 and at their other ends to an eccentric 50 for controlling reciprocal movement of the ram 4. A suitable clutch mechanism 19 may be interconnected between the drive shaft 14 and the crankshaft 16 for selectively disengaging the drive motor 13 and the flywheel 15 from driving engagement with the crankshaft 16. The brake shoe member 20a may be disposed adjacent a brake drum 20b which is operably connected to the crankshaft 16 to facilitate stopping movement of the ram 4.

As shown, a timing chain 21 may be trained about an upper sprocket 22 which may be rotatably driven by the crankshaft 16 through suitable gearing (not shown) and about a lower sprocket 24 which is rotatably driven by the chain 21. The chain, in turn, is to rotate a cam limit switch shaft 26 which actuates cams (shown enclosed at 27) which closes circuits for controlling reciprocal movement of the ram 4, as known in the art.

In accordance with the invention, the position sensing assembly 3 is provided in the form of a servomechanism including a servo generator 28 having a rotor shaft, illustrated schematically at 29, which may be coupled to the cam limit switch shaft 26 for rotation in response to turning movement of the timing chain 21. By this arrangement, angular displacement of the cam limit switch shaft 26 is proportional to the extent of travel of the press ram 4 in its cyclical movement. As seen in FIG. 1, a stator 47 of the servo generator 29 may be rigidly mounted on the frame 2, such as on the timing chain guard 48 and a servo motor 30 is mounted on a support panel 33 remote from the frame 2. By the use of a servomechanism, the control components of the system may be mounted at a remote location from the press so that vibrations in the press structure during normal operations are not transmitted to such components or, at least, their magnitude at the control components will be greatly reduced.

In the embodiment shown, the input terminals of the servo motor 30 may be electrically connected to the output terminals of the servo generator 28 for rotating the rotor shaft 32 of the servo motor, which may be in self-synchronization with the servo generator 28, through the same degree of rotation as the cam limit switch shaft 26. In such self-synchronizing system, the windings may be arranged so that the rotational position change of the rotor of the generator 28 causes an identical rotational position change of the motor rotor. Such a system is available from General Electric Co. under the trademark SELSYN.

In the invention, the size and spacing of the aforesaid mechanical connections between the ram 4 and the cam limit switch shaft may be established, as known in the art, so that a predetermined proportional relationship exists between the location of the ram in its cycle of travel, and the degree of rotation of the cam limit switch shaft 26. Since the rotor shaft 29 of the servo generator 28 is mechanically connected to the cam limit switch shaft 26, the degree of rotation of the generator rotor shaft 29 is substantially identical to that of the rotation of the cam limit switch shaft 26, and thus, directly proportional to the extent of travel of the ram 4 within the cycle thereof.

A rotary shaft position digital encoder 34 is mechanically coupled to the servo motor shaft 32, and is also rotated through the same degree of rotation as the cam limit switch shaft 26. The encoder 34 converts the angular rotation to a digital code which is fed to a digital-to-analog converter 36 so that the digital code is converted to a voltage analog signal.

Figure 3:
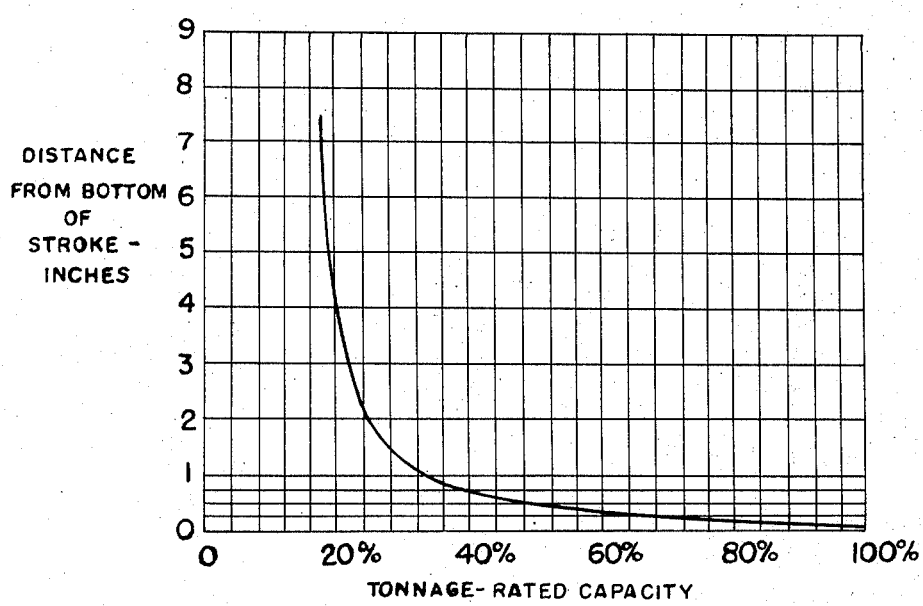
FIG. 3 is a graphic representation of a typical load curve for use with the type of forming press illustrated in FIG. 1.

In the form shown, the theoretical strain signal assembly provided in the form of a function generator 38 which receives the voltage analog signal from the converter 36. The function generator 38 may be present in accordance with the rated capacity tonnage of the curve, such as illustrated in FIG. 3, of the particular press being employed. By this arrangement, there is produced an analog output signal indicative of a predetermined selected strain, such as a theoretical tolerable strain, at an instantaneous location of the ram 4. A plurality of strain links may be mounted on the press columns 8, 9, 10 and 11, but for purposes of illustration, only one strain link, such as at 40, is shown mounted on a press column, as at 8. Accordingly, the following description will proceed only with respect to the operation of the link 40. The voltage output signal of the link 40 is fed through an amplifier 45 to the comparator assembly 12 which also receives the output of the function generator 38. It is to be understood that when using a plurality of strain links, each may be arranged to sense the strain on one of the columns of the press to provide an appropriate signal to the comparator assembly 12. The comparator assembly 12 produces an output signal when the actual load on the press column 8, at any selected position of the ram 4, exceeds the theoretical tolerable load on the press for such ram position in the cycle. The comparator 43 output signal actuates a switch 44 which may deactivate a cycle start switch 46 to prevent the ram from commencing the next cycle of operation. By this arrangement, the press is halted at the completion of any cycle at which the actual load exceeds the desired ram load during any part of the cycle.

As noted, the shaft-position digital encoder 34 converts the rotational movement of the servo motor shaft 32 into a digital output signal. In the preferred form, this may be accomplished by a rotating apertured disc (not shown) which may be suitably mounted on the input shaft which, in turn, may be mechanically attached to the output shaft 32. The apertures of the disc are generally spaced circumferentially in a predetermined pattern which receives a beam of light produced from a photoelectric cell so that as the disc rotates the beam is intermittently interrupted with each interruption corresponding to an increment of rotation of the disc. Moreover, the photoelectric cell generates pulses of electricity with each pulse indicating an increment of rotational movement of the disc. Logic systems connected to the photoelectric cell output convert the gray binary code of the disc to a parallel binary. An example of the shaft-position digital encoder which may be employed in the invention is the 219/5 Model encoder manufactured by the Baldwin Electronics, Inc. of Little Rock, Arkansas. This unit has a Gray Binary Disk Code Format, 256 bits per revolution, with eight tracks and a bit resolution of 84.4 arc minutes.

In order to have a complete input for the functional generator 38, the parallel binary output of the encoder 34 is converted by the digital-to-analog converter 36, such as of the type manufactured by the Burr-Brown Research Corporation, Tucson, Arizona, Model No. DAC20–08U–USB. This converter converts the parallel binary input into a voltage output signal which is proportional to the digital input from the encoder 34. Moreover, the voltage output signal is proportional to the degree of rotation of the cam limit switch shaft 26. Preferably, the converter 36 is a weighted-resistor switching network with an internal reference supply and an operational amplifier to convert the current to a voltage output.

The function generator 38 converts the analog voltage, which represents the position of the ram 4, to an analog voltage representative of a selective predetermined press load, such as the rated press load or the tolerable press load at that instant in its cycle. A preferred function generator may have 10 straight-line approximating, diode resistor networks having uniformly spaced break points. In such case, each segment is adjustable by mechanically varying a potentiometer to adjust the "slope" of the segment to approximate the corresponding slope of the curve of the graph. The graph to which the segments are set to correspond is supplied by the press manufacturer. A sample of such graph, which indicates the desirable force at each point of travel of the press in its cycle is shown in FIG. 3. In operation, the voltage input to the function generator 38 is converted by the adjusted network to a current output which is fed to the summing junction of an operational amplifier to convert the current output of the network to a voltage output to serve as the input for the next stage. A sample of a suitable function generator is Model SPFX–N/P arbitrary function transconductor manufactured by the Philbrick Researches, Inc. of Dedham, Massachusetts.

At the instant that the foregoing system is providing a continually varying output signal indicative of the desirable load for the press ram at its instantaneous position, the actual load on the column is measured by the link 40 on column 8, for example. The link or strain gauge 40 produces a voltage signal which is proportional to the amount of strain on the column, and is amplified by a suitable amplifier 45, such as a Daytronic Corp. Model 870 Strain Gage Data Amplifier having a 0–10 volt output. The theoretically desirable load on the press at each of the various positions of the ram 4 in its cycle is compared to the actual load on the press at such position by feeding the outputs of the function generator 38 and of the strain gauge amplifier 45 to the comparator assembly 12. The comparator assembly 12 may include a comparator 43 having an integrator circuit IC amplifier as the input and a saturating transistor as the output. The comparator 43 may be Model No. 4032/120 manufactured by the Burr Brown Research Corporation. In such case, when the input from the strain gauge amplifier exceeds the input from the function generator, a power transistor is driven into saturation and the output at the collector provides a very low impedance to common, permitting output current flow in a 0–5 volt logic output.

The output of the comparator 43 is shown connected to a static switching device 44 for controlling the press operation. The switching device 44 may be of the type utilizing an SCR to product a constant current output from the first time that it receives a voltage input from the comparator 43 unitl it is deactivated at a later date, as by manual switching. A sample of such a switch is Model No. GB 4200 sold under the trademark, REE-DAC, by the Grigsby-Barton Company. The output of the static switch is suitably connected as by a suitable static switch arrangement to the cycle start switch which actuates each press cycle when the cam limit switch activates it. The static switch thus locks out the operation of the cycle start switch. The output of the static switch may also be in series with a warning device such as a light or a bell. It is to be understood that each of the control devices referred to herein is supplied with a suitable power supply as known in the electronics art.

In a modified embodiment, which is an alternative of the main embodiment referred to hereinbefore, other means than rotary means may be used to sense the location of the ram in its cycle. For example, the ram 4 may have an arm (not shown) projecting therefrom and one end of which moves in sliding contact along a resistor (not shown) mounted parallel to the path of travel of the ram 4. Such arrangement would operate as variable potentiometer, suitably connected to a power source as known in the art, whereby the voltage output of the potentiometer would progressively vary as the ram proceeds in its cycle. In such arrangement, the output of the potentiometer would become the imput for a function generator comparable to the function generator 38. As is the case with the function generator 38 of the main embodiment, such function generator would be preset to produce a voltage output proportional to the theoretical tolerable strain for each position of the ram as indicated by the voltage input to the function generator. The modified system would include strain gauges mounted on the press columns, amplifiers, voltage comparators, and switches responsive to the comparator and adapted to initiate the desired warning signals and/or control of the ram movement, all of which would operate as described in the main embodiment.

In a typical operation of the most preferred embodiment described herein, suitable electrical power supplies (not shown) are provided for operating the various electrical and mechanical components. The system may be programmed by mechanically setting the segments of the function generator 38 (FIG. 2) so that the segments approximate the tolerable fatigue load curve (FIG. 3) supplied by the manufacturer of the press. The cycle start switch is then activated for starting the press and causing the ram 4 to begin its cyclical movements. The servo generator 28 drives the servo motor 30 and continually monitors the position of the ram 4 by sensing the degree of rotation of the cam limit switch shaft 26 which is connected to and driven by the press timing chain 21. The servo motor 30, in turn, drives the shaft-position digital encoder 34. The rotational information is transformed by the shaft digital encoder 34 into a digital signal which is indicative of the ram position 4. This digital signal is then fed to the converter 36 when it is converted to an analog voltage signal also indicative of the ram position. The analog of the ram position is then fed into the preset function generator 38 which then emits an analog signal representative of the theoretical tolerable load at such position of the ram. Simultaneously, the acutal load is monitored by a strain gauge, such as at 42, which is connected to a strain link, such as at 40, mounted on the press column, such as at 8. The output of the strain gauge 42 and of the function generator 38 are then fed to the comparator 43. As long as the actual load sensed by the strain gauge 42 does not at any instant exceed the theoretical load for such ram position, as indicated by the function generator 38, the comparator 43 does not generate an output signal and the press ram cyclical movement continues without interruption. If at any position fo the ram 4, the actual load exceeds the theoretical load, the voltage comparator 43 generates an output signal which activates the static switch 44 to disengage the clutch 19 and apply the brake 20a. As a result, upon completion of the cycle in which an overloading occured at any point in the cycle, the ram 4 will come to rest. In the event a warning device is provided in the system, it will alert an operator to investigate the difficulty. The activation of the press does not commence until the operator has cured the difficulty, such as by removing an improperly positioned workpiece, and manually reactivating the static switch 44 to re-engage the clutch 19 so that the motor 13 will cause the ram to recommence its downward movement for normal operation.

We claim:

1. A system for controlling a press apparatus comprising,
ram means including a ram mounted for a cyclical movement on the press structure,
a rotating member operably connected to the ram whereby its degree of rotation is related to the ram position,
a rotation sensing assembly operably connected to said rotating member for producing ram position signals in response to various ram positions,
a first strain signal generating assembly for receiving said ram position signals and producing theoretical strain signals indicative of predetermined selective strain on the press structure at each position of the ram indicated by said ram position signals,
the second strain signal generating assembly operably connected to the press structure for producing actual strain signals indicative of the actual strain on the press structure imparted by the ram at such various positions, and
a comparative signal assembly for receiving and comparing the theoretical strain signals and the actual strain signals for producing an overload signal when the actual strain exceeds the predetermined selective strain at such various positions.

2. A system in accordance with claim 1, wherein said first strain signal generating assembly comprises a function generator for modifying said ram position signals and producing theoretical strain signals corresponding to the rate load of said press at the positions of the ram indicated by the ram position signal.

3. A system in accordance with claim 1, wherein said rotation sensing assembly includes a shaft-position digital encoder for producing a digital output signal indicative of the degree of rotation of said rotating member.

4. A system in accordance with claim 3, including a digital-to-analog converter for receiving said digital output signal from said shaft-position digital encoder and for producing an analog ram position output signal indicative of the various ram positions.

5. A system in accordance with claim 1, wherein said rotation sensing assembly comprises a servo-generator operably connected to said rotating element,
a servo motor having a rotating drive shaft for rotating a shaft position measuring device, and
said servo motor being electrically connected to said servo generator such that the degree of rotation of said servo motor shaft is a reproduction of the rotation of the rotor of said servo generator.

6. A system in accordance with claim 1, wherein said rotating member comprises a crankshaft operably connected to said ram for moving said ram through its operating cycle,
another rotating member supported for rotation on said press structure,
an endless drive member entrained in driving relation about said rotating members, and
said rotation sensing assembly operably connected to said other shaft for determining the ram position.

7. A system in accordance with claim 6, wherein said other rotating member comprises a rotary cam shaft mounted for rotation on said frame, and
cam limit switches disposed for selective engagement with said rotary cam shaft for controlling the movement of said ram during its operating cycle.

8. A method of controlling a press apparatus having a ram mounted for cyclical movement on a press structure comprising:
mechanically sensing the location of the ram at various positions in its travel through its cycle,
transforming the sensed locations into electrical signals proportional to the location,
generating a signal for theoretical strain on the press apparatus at each such position of the ram,
mechanically sensing the actual strain on the press apparatus at each of such positions of the ram,
transforming the sensed strain to a signal proportional to such strain, and
comparing the actual strain to the theoretical strain and marking the difference therebetween.

9. A method according to claim 8, wherein the press includes a rotary element whose degree of rotation is proportional to the location of the ram in its cycle and wherein the mechanical sensing of the press location is performed by said rotary element.

10. A system for controlling a press apparatus of the type including ram means including a ram mounted for cyclical movement on the press and a rotating member operably connected to the ram whereby its degree of rotation is related to the ram position comprising:
- a rotation sensing assembly operably connected to said rotating member for producing ram position signals in response to various ram positions,
- a first strain signal generating assembly for receiving said ram position signals and producing theoretical strain signals indicative of predetermined selective strain on the press structure at each position of the ram indicated by said ram position signals,
- a second strain signal generating assembly operably connected to the press structure for producing actual strain signals indicative of the actual strain on the press structure imparted by the ram at such various positions, and
- a comparative signal assembly for receiving and comparing the theoretical strain signals and the actual strain signals for producing an overload signal when the actual strain exceeds the predetermined selective strain at such various positions.

11. A system for controlling a press apparatus comprising:
- a ram mounted for cyclical movement on the press structure,
- position sensing means for sensing various positions of the ram,
- transducer means for transducing the sensed ram positions to signals indicative of said ram positions,
- a first strain signal generating assembly for receiving said ram position signals and producing theoretical strain signals indicative of predetermined selective strain on the press structure at each position of the ram indicated by said ram position signals,
- a second strain signal generating assembly operably connected to the press structure for producing actual strain signals indicative of the actual strain on the press structure imparted by the ram at such various positions, and
- a comparative signal assembly for receiving and comparing the theoretical strain signals and the actual strain signals for producing an overload signal when the actual strain exceeds the predetermined selective strain at such various positions.

* * * * *